United States Patent
Becene et al.

(10) Patent No.: US 11,168,942 B2
(45) Date of Patent: Nov. 9, 2021

(54) CIRCULAR CORE FOR HEAT EXCHANGERS

(71) Applicant: Hamilton Sundstrand Corporation, Charlotte, NC (US)

(72) Inventors: Ahmet T. Becene, West Simsbury, CT (US); Michele Hu, Manchester, CT (US); Feng Feng, South Windsor, CT (US); Michael Maynard, Springfield, MA (US); Michael Doe, Southwick, MA (US); Gabriel Ruiz, Granby, CT (US); Ephraim Joseph, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 26 days.

(21) Appl. No.: 16/711,061

(22) Filed: Dec. 11, 2019

(65) Prior Publication Data
US 2020/0284516 A1   Sep. 10, 2020

Related U.S. Application Data

(60) Provisional application No. 62/815,850, filed on Mar. 8, 2019.

(51) Int. Cl.
| F28D 1/00 | (2006.01) |
| F28D 1/02 | (2006.01) |
| F28D 1/047 | (2006.01) |

(52) U.S. Cl.
CPC ........... *F28D 1/0233* (2013.01); *F28D 1/047* (2013.01)

(58) Field of Classification Search
CPC ............................... F28D 1/0233; F28D 1/047
USPC .......................................................... 165/148
See application file for complete search history.

(56) References Cited

U.S. PATENT DOCUMENTS

| 2,774,575 A | 12/1956 | Hellmuth |
| 3,212,570 A | 10/1965 | Holman |
| 4,058,161 A | 11/1977 | Trepaud |
| 4,570,703 A | 2/1986 | Ringsmuth et al. |
| 7,240,723 B2 | 7/2007 | Wu et al. |
| 9,134,072 B2 | 9/2015 | Roisin et al. |
| 9,964,077 B2 | 5/2018 | Neal et al. |
| 9,976,815 B1 | 5/2018 | Roper et al. |
| 2011/0132586 A1* | 6/2011 | Diehl ........................ F28D 7/06 165/157 |

(Continued)

FOREIGN PATENT DOCUMENTS

| EP | 3431911 A1 | 1/2019 |
| FR | 757140 A | 12/1933 |

(Continued)

OTHER PUBLICATIONS

Extended European Search Report for EP Application No. 19216274.1, dated Jul. 15, 2020, 6 pages.

*Primary Examiner* — Davis D Hwu
(74) *Attorney, Agent, or Firm* — Kinney & Lange, P.A.

(57) ABSTRACT

A core arrangement for a heat exchanger includes a plurality of inlets arranged around an axis, a plurality of outlets arranged around the axis, and a plurality of bowed conduits arranged around the axis. The bowed conduits are structurally independent, connect the plurality of inlets to the plurality of outlets, bow outward from the axis between the plurality of inlets and the plurality of outlets, and provide thermal compliance to the core.

20 Claims, 2 Drawing Sheets

(56) References Cited

U.S. PATENT DOCUMENTS

| | | |
|---|---|---|
| 2014/0096763 A1* | 4/2014 | Barmore ................ F24D 3/125 126/714 |
| 2015/0140190 A1 | 5/2015 | Cully et al. |
| 2017/0191762 A1 | 7/2017 | Duelser et al. |
| 2017/0205149 A1 | 7/2017 | Herring et al. |
| 2017/0248372 A1 | 8/2017 | Erno et al. |
| 2018/0038654 A1 | 2/2018 | Popp et al. |
| 2018/0051934 A1 | 2/2018 | Wentland et al. |
| 2018/0100703 A1 | 4/2018 | Beaver et al. |
| 2018/0100704 A1 | 4/2018 | Lewandowski et al. |
| 2018/0283794 A1 | 10/2018 | Cerny et al. |
| 2018/0283795 A1 | 10/2018 | Cerny et al. |

FOREIGN PATENT DOCUMENTS

| | | |
|---|---|---|
| GB | 400557 A | 10/1933 |
| GB | 2217828 A | 11/1989 |

\* cited by examiner

CIRCULAR CORE FOR HEAT EXCHANGERS

CROSS-REFERENCE TO RELATED APPLICATION(S)

This application claims the benefit of U.S. Provisional Application No. 62/815,850 filed Mar. 8, 2019 for "CIRCULAR CORE FOR HEAT EXCHANGERS" by A. Becene, M. Hu, F. Feng, M. Maynard, M. Doe, G. Ruiz, and E. Joseph.

BACKGROUND

The present disclosure is related generally to heat exchangers and more particularly to heat exchanger core designs.

Heat exchangers can provide a compact, low-weight, and highly effective means of exchanging heat from a hot fluid to a cold fluid. Heat exchangers that operate at elevated temperatures, such as those used in modern aircraft engines, often have short service lifetimes due to thermal stresses, which can cause expansion and cracking of the fluid conduits. Thermal stresses can be caused by mismatched temperature distribution, component stiffness, geometry discontinuity, and material properties (e.g., thermal expansion coefficients and modulus), with regions of highest thermal stress generally located at the interface of the heat exchanger inlet/outlet and core. Additionally, stresses due to vibration can arise when the natural frequencies of the component coincide significantly with engine operating frequencies.

A need exists for heat exchangers with improved performance under thermal and vibrational stress.

SUMMARY

A core arrangement for a heat exchanger includes a plurality of inlets arranged around an axis, a plurality of outlets arranged around the axis, and a plurality of bowed conduits arranged around the axis. The bowed conduits connect the plurality of inlets to the plurality of outlets and provide thermal compliance to the core.

The present summary is provided only by way of example, and not limitation. Other aspects of the present disclosure will be appreciated in view of the entirety of the present disclosure, including the entire text, claims and accompanying figures.

Figure 1:
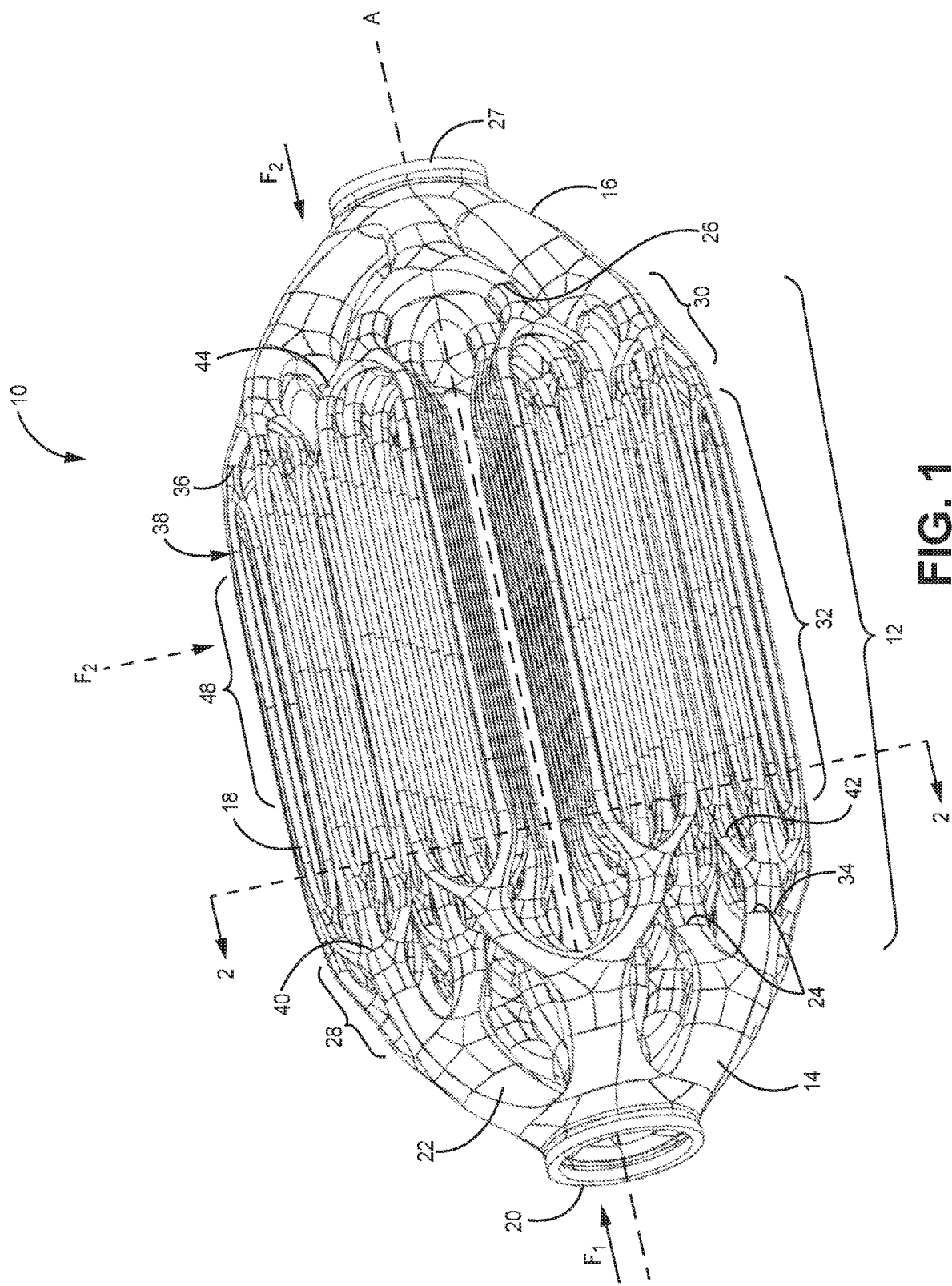
FIG. 1 is a perspective view of a heat exchanger according to an embodiment of the present disclosure.

While the above-identified figure sets forth an embodiment of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a heat exchanger core, which is designed to reduce stiffness and thereby provide improved performance under thermal stress. Inlets and outlets of the heat exchanger are connected by a core disposed about an axis, which includes compliant conduits that bow outward from the axis. During operation, the bowed conduits are capable of relieving thermal stress through bending deformation. The heat exchanger of the present disclosure can be additively manufactured to achieve varied tubular dimensions (e.g., inner diameter, wall thicknesses, curvature, etc.), which allows for the manufacture of a heat exchanger specifically tailored for a desired operating environment.

Figure 2:
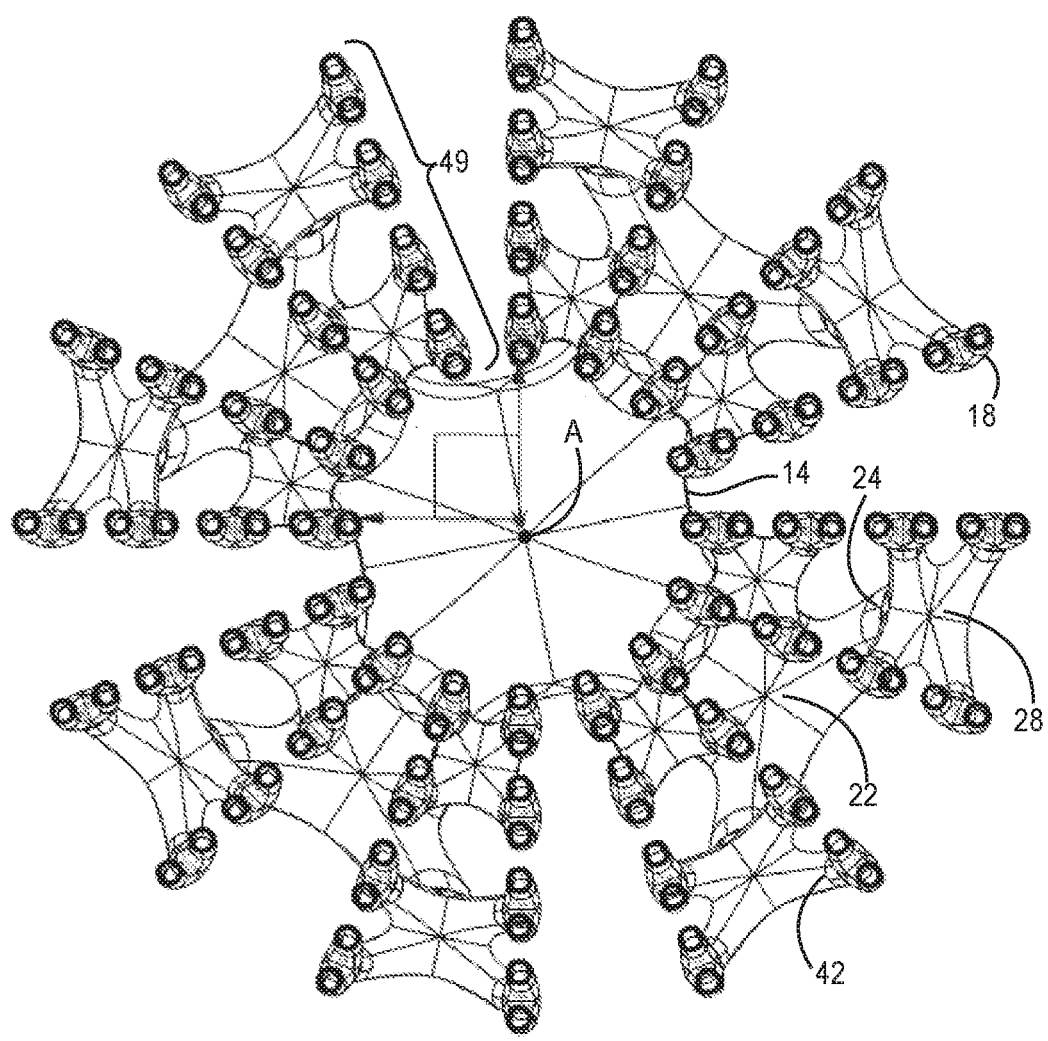
FIG. 2 is a radial cross-sectional view of the heat exchanger of FIG. 1 taken along the line 2-2.

FIG. 1 shows a perspective view of heat exchanger 10, having core 12 disposed between inlet header 14 and outlet header 16. FIG. 2 provides a radial cross-sectional view of a portion of heat exchanger 10 taken along the line 2-2. Core 12 can be disposed about axis A, which can run through inlet header 14 and outlet header 16. During operation of heat exchanger 10, a first fluid $F_1$ is provided to inlet header 14, flows through core 12, and exits through outlet header 16. First fluid $F_1$ can be a relatively hot fluid, from which thermal energy can be transferred to a cooler second fluid $F_2$. As illustrated in FIG. 1, heat exchanger 10 can be arranged as a cross flow heat exchanger with second fluid $F_2$ flowing substantially perpendicular to first fluid $F_1$. Alternatively, heat exchanger 10 can be arranged as a counter-flow heat exchanger with second fluid $F_2$ flowing substantially parallel to and in the opposite direction of first fluid $F_1$. In some embodiments, second fluid $F_2$ can be confined to channels (not shown) to direct and separate flow of second fluid $F_2$, thereby allowing for more uniform flow distribution and more efficient heat transfer. For example, a plurality of walls, ribs, or other solid structures can extend generally parallel to and between core conduits to define distinct second fluid $F_2$ cooling flow channels.

Core 12 includes a plurality of bowed conduits 18 arranged around axis A and connecting inlet header 14 to outlet header 16. The number and arrangement of bowed conduits 18 can vary to accommodate varying operations as further disclosed herein. Inlet header 14 and outlet header 16 can each have a branched configuration designed to connect the plurality of bowed conduits 18. The branched configurations of heat exchanger 10 can exhibit a fractal geometry with sequential branched stages and intervening splits or intersections. Branching of inlet header 14 and outlet header 16 is scalable and configurable to match the number of bowed conduits 18 and geometrical arrangement of bowed conduits 18 in core 12. In one non-limiting embodiment, illustrated in FIG. 1, inlet header 14 has inlet 20, which branches into four smaller circumferentially distributed conduits 22, each of which branches into four smaller outlets 24 to provide a total of 16 outlets 24 configured to direct first fluid $F_1$ to 16 bowed conduits 18 of core 12. Outlet header 16 can have the same geometrical configuration as inlet header 14, having 16 inlets 26 for receiving first fluid $F_1$ from bowed conduits 18 and outlet 27 for discharging cooled fluid from heat exchanger 10. Inner diameters and wall thicknesses of each of the branched sections of inlet header 14 and outlet header 16 can be optimized for fluid flow and stiffness.

Each of the bowed conduits 18 extends axially and includes an inlet section 28, an outlet section 30, and a mid-section 32 disposed there between. Inlet section 28 includes inlet 34, which adjoins outlet 24 of inlet header 14 to receive first fluid $F_1$ from inlet header 14. Outlet section 30 includes outlet 36, which adjoins inlet 26 of outlet header 16 to supply first fluid $F_1$ to outlet header 16. Mid-section 32 can include one or more conduits 38 to conduct fluid from inlet 34 to outlet 36. Inlet header 14, outlet header 16, and core 12 can be monolithically formed such that delineation between inlet headers 14, 16 and core 12 is arbitrary. In some embodiments, inlet section 28 can include a flow dividing section 40, located at an opposite end from inlet 34 and in which inlet section 28 branches into a plurality of outlets 42 to divide and provide flow to multiple mid-section conduits 38. Outlet section 30 can likewise include a flow recombining section 44, located at an opposite end from outlet 36 and in which outlet section 30 branches into a plurality of inlets 46 to receive and recombine flow from multiple mid-section conduits 38. Flow recombining section 44 can substantially mirror flow dividing section 40. In one non-limiting example, as illustrated in FIG. 1, each inlet section 28 can branch into two outlets 42 to provide first fluid F1 to two mid-section conduits 38. Likewise, outlet section 30 can branch into two inlets 46 to receive and recombine first fluid F1 from the two mid-section conduits 38. As will be understood by one of ordinary skill in the art, the number of mid-section conduits can vary depending on the application of heat exchanger 10 and heat transfer requirements. Furthermore, branching is not limited to inlet and outlet sections 28 and 30. Mid-section conduits 38 can also be further divided as illustrated in FIG. 1. In each branching section, flow is divided or recombined. To maintain pressure and fluid velocity across core 12, flow is divided into conduits having smaller inner diameters and recombined in conduits having larger inner diameters. As such, mid-section conduits 38 have smaller inner diameters than inlet 34 and outlet 36 of inlet section 28 and outlet section 30, respectively. It will be understood that the relative size of inner diameters of each conduit can be provided to optimize fluid dynamics through core 12.

Bowed conduits 18 are bowed outward from axis A between inlet 34 and outlet 36. Each bowed conduit 18 is mechanically independent from each of the other bowed conduits 18 and joined only to inlet header 14 and outlet header 16 at opposite ends of core 12. Bowing is used to reduce stiffness in core 12 and thereby reduce thermal stresses. As thermal load increases, bowed conduits 18 can bend to accommodate or relive the thermal stress. The ability of each bowed conduit 18 to independently bend with thermal load increases compliance of heat exchanger 10 as a whole and thereby reduces thermal stress on heat exchanger 10 as a whole.

Bowed conduits 18 can be bowed fully across a longitudinal length from inlet 34 to outlet 36 or can be bowed across a portion of the length. For example, in some embodiments, mid-section conduits 38 can have a straight section 48 over which no bowing or curvature is present. Bowed conduits 18 can be generally symmetrical from inlet 34 to outlet 36. As such, a curvature in inlet section 28 can generally match a curvature in outlet section 30. The degree of bowing or height to which bowed conduits 18 are displaced from a straight line connecting inlet 34 and outlet 36 can vary within core 12 and between differing applications, with increased bowing or height resulting in increased compliance (reduced stiffness) and thereby lower thermal stress to core 12. Increased compliance in bowed conduits 18 can result in an adverse vibrational response and reduced internal pressures. Therefore, the advantages provided by added compliance must be carefully balanced with the associated drawbacks.

In addition to increased bowing, core 12 compliance can be increased by reducing wall thickness in the longitudinal direction (i.e., in mid-section conduits 38). Reduced wall thickness allows for increased thermal expansion. Wall thickness can be increased in the transverse direction (i.e., inlet and outlet sections 28 and 30) to increase stiffness and reduce vibrational response.

Bowed conduits 18 can be arranged around axis A in radially stacked layers 49 having different radial heights from axis A, while retaining a consistent degree of bowing between layers 49 (i.e., the bowed conduits 18 can have the same geometry in all layers) (shown in FIG. 2). As such, all bowed conduit 18 can have equal lengths to provide uniform flow of first fluid $F_1$ through core 12. The number of layers 49 of bowed conduits 18 can be varied depending factors such as spatial constraints and flow requirements. Radial displacement from axis A can be varied depending on the direction of flow of second fluid $F_2$. When heat exchanger 10 is arranged as a counter-flow heat exchanger with second fluid $F_2$ flowing substantially parallel to and in the opposite direction of first fluid $F_1$, bowed conduits 18 can be radially displaced from axis A to a location outward from an outer diameter of inlet 20 and outlet 27 as outlet 27 can choke flow of second fluid $F_2$. Such radial displacement may not be necessary when heat exchanger 10 is arranged as a cross-flow heat exchanger. Bowed conduits 18 can be arranged around axis A in one or more concentrically arranged circles, as illustrated in FIG. 2. In alternative embodiments, bowed conduits 18 can be arranged in one or more ellipses, which could provide the bowed geometry, while reducing a height of core 12. Bowed conduits 18 can be arranged around axis A symmetrically as illustrated in FIG. 2, or asymmetrically. Mid-section conduits 38, inlet section inlets 34 and outlets 42, and outlet section inlets 46 and outlets 36 can be spaced circumferentially and generally evenly spaced to evenly distribute flow of first fluid $F_1$ in the space of core 12. As illustrated in FIG. 1, the two mid-section conduits 38 of each bowed conduit 18 are spaced circumferentially and equally radially displaced from axis A.

The components of heat exchanger 10 can be formed partially or entirely by additive manufacturing. For metal components (e.g., Inconel, aluminum, titanium, etc.), additive manufacturing processes include but are not limited to powder bed fusion techniques such as direct metal laser sintering (DMLS), laser net shape manufacturing (LNSM), and electron beam manufacturing (EBM). For polymer or plastic components, stereolithography (SLA) can be used. Additive manufacturing is particularly useful in obtaining unique geometries (e.g., varied core tube radii, arcuate core tubes, branched inlet and outlet headers) and for reducing the need for welds or other attachments (e.g., between inlet header 14 and bowed conduits 12). However, other suitable manufacturing process can be used. For example, header and core elements can in some embodiments be fabricated separately and joined via later manufacturing steps.

The disclosed core arrangement offers improved thermal and mechanical properties. Bowed conduits 18 provide increased compliance in the longitudinal direction to allow for thermal growth of core 12, while increased wall thicknesses in inlet and outlet sections 28 and 30 of bowed conduits 12 increases stiffness in the transverse direction to reduce vibrational response.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A core arrangement for a heat exchanger according to an embodiment of this disclosure, among other possible things, includes a plurality of inlets arranged around an axis, a plurality of outlets arranged around the axis, and a plurality of bowed conduits arranged around the axis. The bowed conduits connect the plurality of inlets to the plurality of outlets and provide thermal compliance to the core.

The core arrangement of the preceding paragraph can optionally include, additionally and/or alternatively, any one or more of the following features, configurations and/or additional components:

A further embodiment of the foregoing core arrangement, wherein the plurality of bowed conduits can include a plurality of inlet sections, wherein each of the plurality of inlet sections includes one of the inlets of the plurality of inlets at a first end and an outlet branching section at a second end, opposite the first end, that branches to form a plurality of inlet section outlets.

A further embodiment of the foregoing core arrangement, wherein the plurality of bowed conduits can further include a plurality of outlet sections, wherein each of the plurality of outlet sections includes one of the outlets of the plurality of outlets at a third end and a fourth end, opposite the third end, that branches to form a plurality of outlet section inlets.

A further embodiment of the foregoing core arrangement, wherein the plurality of bowed conduits can further include a plurality of mid-core sections, wherein each of the plurality of mid-sections comprises a plurality of mid-section conduits that connect the inlet section outlets to the outlet section inlets.

A further embodiment of the foregoing core arrangement, wherein each conduit of the plurality of mid-section conduits can include a straight section along a length of the mid-section conduits.

A further embodiment of the foregoing core arrangement, wherein conduits of the plurality of bowed conduits can be arranged around the axis in one or more circles.

A further embodiment of the foregoing core arrangement, wherein conduits of the plurality of bowed conduits can be arranged around the axis in one or more ellipses.

A further embodiment of the foregoing core arrangement, wherein conduits of the plurality of bowed conduits can be arranged around the axis in a plurality of radially separated stacked layers.

A further embodiment of the foregoing core arrangement, wherein bowed conduits within each of the plurality of layers can be spaced circumferentially about the axis.

A further embodiment of the foregoing core arrangement, wherein bowed conduits can have the same geometry in all layers.

A further embodiment of the foregoing core arrangement, wherein the plurality of inlet sections and the plurality of outlet sections can each include a first wall thickness and the plurality of mid-section conduits comprise a second wall thickness, wherein the second wall thickness is less than the first wall thickness.

A further embodiment of the foregoing core arrangement, wherein the plurality of inlet sections and the plurality of outlet sections can include a first inner diameter and the plurality of mid-section conduits comprise a second inner diameter, wherein the second inner diameter is less than the first inner diameter.

A further embodiment of the foregoing core arrangement, wherein outlets of the plurality of inlet section can be spaced circumferentially about the axis.

A further embodiment of the foregoing core arrangement, wherein bowed conduits of the plurality of bowed conduits can be arranged symmetrically.

A further embodiment of the foregoing core arrangement, wherein the bowed conduits can be radially displaced from the axis by a distance greater than an outlet of the heat exchanger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A core arrangement for a heat exchanger, the core arrangement comprising:
   a plurality of inlets arranged around an axis;
   a plurality of outlets arranged around the axis; and
   a plurality of bowed conduits arranged around the axis and connecting the plurality of inlets to the plurality of outlets, wherein the plurality of bowed conduits are structurally independent and bow outward from the axis between the plurality of inlets and the plurality of outlets; and wherein the plurality of bowed conduits comprises:
   a plurality of inlet sections, wherein each of the plurality of inlet sections comprises one of the inlets of the plurality of inlets at a first end and an outlet branching section at a second end, opposite the first end, that branches to form a plurality of inlet section outlets;
   a plurality of outlet sections, wherein each of the plurality of outlet sections comprises one of the outlets of the plurality of outlets at a third end and a fourth end, opposite the third end, that branches to form a plurality of outlet section inlets; and
   a plurality of mid-sections, wherein each of the plurality of mid-sections comprises a plurality of mid-section conduits that connect the inlet section outlets to the outlet section inlets;
   wherein the plurality of inlet sections and the plurality of outlet sections comprise a first inner diameter and the plurality of mid-section conduits comprise a second inner diameter, wherein the second inner diameter is less than the first inner diameter.

2. The core arrangement of claim 1, wherein each conduit of the plurality of mid-section conduits includes a straight section along a length of the mid-section conduits.

3. The core arrangement of claim 1, wherein conduits of the plurality of bowed conduits are arranged around the axis in one or more circles.

4. The core arrangement of claim 1, wherein conduits of the plurality of bowed conduits are arranged around the axis in one or more ellipses.

5. The core arrangement of claim 1, wherein conduits of the plurality of bowed conduits are arranged around the axis in a plurality of radially separated stacked layers.

6. The core arrangement of claim 5, wherein bowed conduits within each of the plurality of layers are spaced circumferentially about the axis.

7. The core arrangement of claim 5, wherein bowed conduits have the same geometry in all layers.

8. The core arrangement of claim 1, wherein the plurality of inlet sections and the plurality of outlet sections each comprise a first wall thickness and the plurality of mid-section conduits comprise a second wall thickness, wherein the second wall thickness is less than the first wall thickness.

9. The core arrangement of claim 1, wherein outlets of the plurality of inlet sections are spaced circumferentially about the axis.

10. The core arrangement of claim 1, wherein bowed conduits of the plurality of bowed conduits are arranged symmetrically.

11. The core arrangement of claim 1, wherein the bowed conduits are radially displaced from the axis by a distance greater than an outlet of the heat exchanger.

12. A core arrangement for a heat exchanger, the core arrangement comprising:
    a plurality of inlets arranged around an axis;
    a plurality of outlets arranged around the axis; and
    a plurality of bowed conduits arranged around the axis and connecting the plurality of inlets to the plurality of outlets, wherein the plurality of bowed conduits are structurally independent and bow outward from the axis between the plurality of inlets and the plurality of outlets;
    wherein conduits of the plurality of bowed conduits are arranged around the axis in a plurality of radially separated stacked layers.

13. The core arrangement of claim 12, wherein the plurality of bowed conduits comprise a plurality of inlet sections, wherein each of the plurality of inlet sections comprises one of the inlets of the plurality of inlets at a first end and an outlet branching section at a second end, opposite the first end, that branches to form a plurality of inlet section outlets, and wherein the plurality of bowed conduits further comprise a plurality of outlet sections, wherein each of the plurality of outlet sections comprises one of the outlets of the plurality of outlets at a third end and a fourth end, opposite the third end, that branches to form a plurality of outlet section inlets.

14. The core arrangement of claim 13, wherein the plurality of bowed conduits further comprise a plurality of mid-sections, wherein each of the plurality of mid-sections comprises a plurality of mid-section conduits that connect the inlet section outlets to the outlet section inlets.

15. The core arrangement of claim 12, wherein bowed conduits within each of the plurality of layers are spaced circumferentially about the axis.

16. The core arrangement of claim 4, wherein conduits of the plurality of bowed conduits are arranged around the axis in one or more circles or ellipses.

17. A core arrangement for a heat exchanger, the core arrangement comprising:
    a plurality of inlets arranged around an axis;
    a plurality of outlets arranged around the axis; and
    a plurality of bowed conduits arranged around the axis and connecting the plurality of inlets to the plurality of outlets, wherein the plurality of bowed conduits are structurally independent and bow outward from the axis between the plurality of inlets and the plurality of outlets;
    wherein conduits of the plurality of bowed conduits are arranged around the axis in one or more circles or one or more ellipses.

18. The core arrangement of claim 17, wherein the plurality of bowed conduits comprise:
    a plurality of inlet sections, wherein each of the plurality of inlet sections comprises one of the inlets of the plurality of inlets at a first end and an outlet branching section at a second end, opposite the first end, that branches to form a plurality of inlet section outlets;
    a plurality of outlet sections, wherein each of the plurality of outlet sections comprises one of the outlets of the plurality of outlets at a third end and a fourth end, opposite the third end, that branches to form a plurality of outlet section inlets; and
    a plurality of mid-sections, wherein each of the plurality of mid-sections comprises a plurality of mid-section conduits that connect the inlet section outlets to the outlet section inlets.

19. The core arrangement of claim 17, wherein the plurality of inlet sections and the plurality of outlet sections comprise a first inner diameter and the plurality of mid-section conduits comprise a second inner diameter, wherein the second inner diameter is less than the first inner diameter.

20. The core arrangement of claim 18, wherein conduits of the plurality of bowed conduits are arranged around the axis in a plurality of radially separated stacked layers.

* * * * *